(12) United States Patent  (10) Patent No.: US 6,591,712 B2
Goto et al.  (45) Date of Patent: Jul. 15, 2003

(54) PEDAL DEVICE FOR AUTOMOBILE AND DAMPER FOR USE IN THE SAME

(75) Inventors: Tadashi Goto, Tokyo (JP); Masamitsu Kojima, Fujisawa (JP); Yoshiteru Igarashi, Fujisawa (JP); Katsutoshi Kumazawa, Fujisawa (JP)

(73) Assignee: Oiles Corporation, Tokyo (JP)

( * ) Notice: Subject to any disclaimer, the term of this patent is extended or adjusted under 35 U.S.C. 154(b) by 0 days.

(21) Appl. No.: 09/913,897

(22) PCT Filed: Dec. 20, 2000

(86) PCT No.: PCT/JP00/09035

§ 371 (c)(1),
(2), (4) Date: Sep. 7, 2001

(87) PCT Pub. No.: WO01/46770

PCT Pub. Date: Jun. 28, 2001

(65) Prior Publication Data

US 2002/0157495 A1 Oct. 31, 2002

(30) Foreign Application Priority Data

Dec. 22, 1999 (JP) .......................... 11-364847

(51) Int. Cl.⁷ ................................................ G05G 1/14
(52) U.S. Cl. ...................................................... 74/514
(58) Field of Search ........................... 74/512, 514, 513

(56) References Cited

U.S. PATENT DOCUMENTS

| | | | |
|---|---|---|---|
| 1,619,035 A | 3/1927 | Rafter | 267/208 |
| 4,944,269 A | 7/1990 | Imoehl | 123/399 |
| 5,295,409 A | 3/1994 | Byram et al. | 74/514 |
| 5,335,563 A * | 8/1994 | Yamamoto et al. | 74/512 |
| 5,408,899 A * | 4/1995 | Stewart | 74/513 |
| 5,529,296 A | 6/1996 | Kato | 267/155 |
| 5,697,260 A | 12/1997 | Rixon et al. | 74/514 |
| 6,240,801 B1 * | 6/2001 | Kojima et al. | 74/513 |
| 6,332,374 B1 * | 12/2001 | Someda et al. | 74/513 |

FOREIGN PATENT DOCUMENTS

| | | |
|---|---|---|
| EP | 943835 | 9/1999 |
| JP | 4-121432 | 4/1992 |
| JP | 4-128519 | 4/1992 |
| JP | 6-299874 | 10/1994 |
| JP | 11-321374 | 11/1999 |
| JP | 11-338569 | 12/1999 |

* cited by examiner

*Primary Examiner*—David A. Bucci
*Assistant Examiner*—Bradley K. Van Pelt
(74) *Attorney, Agent, or Firm*—Nixon & Vanderhye (57) ABSTRACT

A pedal device (1) for an automobile includes a supporting frame (2); an accelerator pedal arm (3) made of a rigid metal and supported by the supporting frame (2) in such a manner as to be rotatable about an axis A in directions R; a spring means (4) for rotatively urging the accelerator pedal arm (3) toward an initial position of its rotation; a damper (5) for imparting a resistance force to the rotation in the directions R of the accelerator pedal arm (3); and a stopper for stopping the rotation of the accelerator pedal arm (3) at the initial position of its rotation.

19 Claims, 8 Drawing Sheets

PEDAL DEVICE FOR AUTOMOBILE AND DAMPER FOR USE IN THE SAME

TECHNICAL FIELD

The present invention relates to a pedal device having a damper for imparting an appropriate brake to an accelerator pedal arm, a brake pedal arm, a clutch pedal arm, or the like of an automobile and a damper suitable for use in the pedal device.

BACKGROUND ART

Fine control of fuel injection in automotive engines is required for the purposes of low fuel consumption of automobiles and reduction of carbon dioxide, and electronic regulation of the throttle valve opening based on the pressing down of an accelerator pedal has been put to practical use.

In automobiles in which fuel injection of the engine is effected by electronic control, an accelerator cable disposed between an accelerator pedal arm and a throttle valve is normally omitted. With these automobiles without the accelerator cables, the feeling of reaction force with respect to the pedal pressing force differs in comparison with the accelerator cables. Moreover, the hysteresis characteristic in the relationship between the pressing force in the pedal pressing direction and the holding force in the pedal returning direction forms a substantially narrow loop, i.e., the pedal-pressing-force characteristic with respect to the amount of the pedal pressed becomes linear. Therefore, if a general driver who is accustomed to driving an automobile with the accelerator cable drives the automobile without the accelerator cable, there arises a problem in that, for instance, fatigue can occur early when shocks of the acceleration or deceleration of the automobile occur due to the movement of the accelerator pedal during running on a rough terrain, or when the driver tries to fixedly hold the accelerator pedal for a long time during such as high-speed running.

To prevent excessive pressing down by obtaining a large reaction force with respect to the pedal pressing force, if the spring force of a return spring for returning the pedal arm to the initial position of rotation is simply made large, there is a possibility of causing early fatigue to the pedal-pressing foot due to the large reaction force from the return spring during constant-speed running.

Accordingly, a damper has been proposed which imparts a resistance force based on linearly increasing friction between a rotating member rotated by the rotation of the pedal arm and a movable member coming into contact with this rotating member. According to this damper, it is possible to obtain favorable effects such as that the damper has such a hysteresis characteristic that the range of the pedal pressing force allowing the amount of the pedal pressed to be maintained at a fixed level in correspondence with the amount of the pedal pressed can be made large, that the damper can be installed compactly, that the adjustment of the reaction force can be effected very simply, and that a change in its characteristics can be reduced. However, since the hysteresis characteristic is obtained on the basis of dynamic friction and static friction, large resistance based on static friction before leading to dynamic friction is applied to the pedal arm as a reaction force at the start of the pressing down of the pedal from the initial position of rotation of the pedal arm. Consequently, the driver of the automobile who operates the pedal arm receives from the pedal the unpleasant sensation of, as it were, pressing the foot against an immovable wall in the early stage of pressing down, and thus experiences a feeling of fatigue in the pedal operation.

The above-described problem occurs not only with the accelerator pedal arm, but can also occur with, for example, the brake pedal arm, the clutch pedal arm, and the foot-operated parking brake arm.

The present invention has been devised in view of the above-described aspects, and its object is to provide a pedal device for an automobile which excels in the operational feeling, does not cause the driver to experiences a feeling of fatigue in the pedal operation, and makes it possible to enlarge the range of the pedal pressing force allowing the amount of the pedal pressed to be maintained at a fixed level in correspondence with the amount of the pedal pressed, as well as a damper suitable for use in the pedal device.

DISCLOSURE OF INVENTION

A pedal device for an automobile in accordance with a first aspect of the invention comprises a damper for imparting a resistance force to the rotation of a pedal arm, the damper including a movable member which is disposed movably in an axial direction but immovable in a direction about the axis, a rotating member disposed rotatably about the axis and facing the movable member, spring means for resiliently urging the movable member toward the rotating member, and frictional-resistance-force generating means for producing a frictional resistance force as the resistance force in the rotation of the rotating member, and for increasing the frictional resistance force by increasing the spring force of the spring means by causing the movable member to move away from the rotating member in the axial direction against the resiliency of the spring means, wherein a torque which gradually increases from an initial position of rotation of the pedal arm to any angle of 0.5 to 20% of a full angle of rotation thereof is imparted to the rotating member to permit the rotation of the pedal arm, and the rotating member is subsequently rotated in conjunction with the rotation of the pedal arm.

In accordance with the pedal device according to the first aspect, a torque which gradually increases from the initial position of rotation to any angle of 0.5 to 20% of the full angle of rotation is imparted to the rotating member to permit the rotation of the pedal arm, and the rotating member is subsequently rotated in conjunction with the rotation of the pedal arm. Accordingly, at the start of the pressing down of the pedal, the pedal arm is rotated in conjunction with it, with the result that it is possible to eliminate the sensation of being subjected to a large resistance based on the static friction in the frictional-resistance-force generating means. Hence, the driver who operates the pedal arm is able to start the automobile naturally without receiving from the pedal the unpleasant sensation of pressing the foot against, so to speak, an immovable wall, and is able to comfortably effect the pedal operation without experiencing fatigue.

If the angle of rotation of the pedal arm for rotating the rotating member in conjunction with the rotation of the pedal arm is less than 0.5% of the full angle of rotation, the driver receives a large reaction force based on the static friction in the frictional-resistance-force generating means substantially at the same time as the pressing of the pedal. This situation is substantially similar to the case in which the foot is pressed against an immovable wall, and natural starting of the automobile is hence impossible. On the other hand, the angle of rotation of the pedal arm exceeds 20% of the full angle of rotation, the range of the pedal pressing force allowing the amount of the pedal pressed to be maintained at a fixed level in correspondence with the amount of the pedal pressed (the angle of rotation of the pedal arm) becomes small, and this effect can be obtained only at a high speed.

In addition, in accordance with the pedal device according to the first aspect, when the rotating member is rotated by the rotation of the pedal arm due to the pressing down of the pedal, the frictional resistance force which increases occurs in the frictional-resistance-force generating means. Therefore, by virtue of this resistance force, it is possible to prevent fuel from being consumed more than before by, for example, excessively pressing down on the accelerator pedal. Moreover, as the result of the fact that it is possible to enlarge the range of the pedal pressing force in which the angle of rotation of the pedal arm can be maintained at a fixed level in correspondence with the amount of the pedal pressed, the amount of the pedal pressed can be easily maintained at a fixed level in correspondence with the speed during the constant-speed running at various speeds ranging from the low speed to the high speed. Hence it is possible to overcome the trouble of such as causing early fatigue to the pedal-pressing foot.

In the pedal device for an automobile in accordance with a second aspect of the invention, in the pedal device according to the first aspect, the frictional-resistance-force generating means has an inclined surface formed on one surface of the rotating member facing the movable member and an inclined surface formed on one surface of the movable member facing the rotating member and adapted to be brought into planar contact with the inclined surface.

In accordance with the pedal device according to the second aspect, by appropriately setting the coefficients of friction of both inclined surfaces, it is possible to approximately determine the resistance force which can be applied to the rotation of the pedal arm. Further, it is possible to effect very simply the adjustment of the reaction force having a hysteresis characteristic in the relationship between the amount of the pedal pressed and the pedal pressing force.

In the pedal device for an automobile in accordance with a third aspect of the invention, in the pedal device according to the first or second aspect, the movable member has a movable member body and a projection formed integrally on one surface of the movable member body in such a manner as to project in the axial direction toward one surface of the rotating member, the rotating member has a rotating member body and a projection formed integrally on one surface of the rotating member body in such a manner as to project in the axial direction toward the one surface of the movable member, and the frictional-resistance-force generating means has inclined surfaces which are formed on both projections of the movable member and the rotating member and are brought into planar contact with each other.

In the pedal device according to the third aspect, since the the frictional-resistance-force generating means is formed by inclined surfaces which are formed on both projections of the movable member and the rotating member and are brought into planar contact with each other, the pedal device can be made very compact, and can be installed by making effective use of a small space. Furthermore, by appropriately setting the coefficients of friction of the inclined surfaces which are brought into planar contact with each other, it is possible to approximately determine the resistance force which can be applied to the rotation of the pedal arm. Further, it is possible to effect very simply the adjustment of the reaction force having a hysteresis characteristic in the relationship between the amount of the pedal pressed and the pedal pressing force.

In the pedal device for an automobile in accordance with a fourth aspect of the invention, in the pedal device according to any one of the above-described aspects, the rotation of the pedal arm is adapted to be transmitted to the rotating member via a rotatable shaft, the damper further includes a hollow cylindrical member in which the movable member and the rotating member are accommodated and a cover disposed at one end surface of the hollow cylindrical member in such a manner as to be immovable in the direction about the axis, the rotating member is in contact with the cover in such a manner as to be slidable in the direction about the axis and by being urged by the spring force of the spring means, and the movable member is in contact with the hollow cylindrical member in such a manner as to be slidable in the axial direction.

In the pedal device according to the fourth aspect, in the rotation of the rotating member, the frictional resistance between the rotating member and the cover and the frictional resistance between the movable member and the hollow cylindrical member can be respectively added to the frictional resistance of the frictional-resistance-force generating means. Therefore, the frictional-resistance-force generating means can be arranged more compactly.

In the pedal device for an automobile in accordance with a fifth aspect of the invention, in the pedal device according to the fourth aspect, the pedal arm and the rotatable shaft are substantially rigid members in comparison with the hollow cylindrical member, the rotating member, the movable member and the cover, and the rotation of the pedal arm from the initial position of rotation to any angle of 0.5 to 20% of the full angle of rotation is effected by the elastic deformation of at least one of the hollow cylindrical member, the rotating member and the movable member.

In accordance with the pedal device according to the fifth aspect, since the early rotation of the pedal arm is allowed by the elastic deformation of at least one of the hollow cylindrical member, the rotating member and the movable member, a resilient reaction force is gradually applied to the pressing foot in proportion to the amount of pressing, so that the operational feeling during the early rotation of the pedal arm can be made very excellent.

In the case where the early rotation of the pedal arm is effected by the elastic deformation of the hollow cylindrical member, the rotating member and the movable member, by appropriately setting their moduli of elasticity, it is possible to provide a pedal device imparting an optimum operational feeling in the early rotation of the pedal arm.

As the materials for forming the hollow cylindrical member, the rotating member and the movable member for effecting the elastic deformation, the following are required. First, since a rotatable shaft is normally inserted in the rotating member, and this rotatable shaft repeats rotational motion, the rotating member must be such as to be able to withstand its repeated stress, and breakage and permanent set in fatigue (permanent deformation) must not occur. Moreover, since the rotating member slides on the movable member, and on the cover in some cases, the rotating member should preferably be formed of a material which excels in wear resistance and generates a stable frictional torque. In a case where the rotatable shaft is directly inserted in the rotating member, a fairly high strength is required for the rotating member, but by interposing a link mechanism or the like without directly inserting the rotatable shaft, it is possible to reduce the load applied to the rotating member.

As for the movable member and the hollow cylindrical member, the strength is not so much required as the rotating member, but, basically speaking, the breakage and the permanent set in fatigue must not occur in the repeated rotation of the rotating member in the same way as the rotating member, and the movable member and the hollow cylindrical member should preferably be formed of materials which excel in wear resistance and generate a stable frictional torque in sliding with their respective mating members.

By taking these aspects into consideration, it suffices if a modulus of elasticity in bending, E, of a material for forming the hollow cylindrical member is such that $2 \times 10^4$ kgf/cm$^2 \leq E$ as in the pedal device in accordance with a sixth aspect of the invention. In addition, the material for forming the hollow cylindrical member should preferably be formed of a resin as a base material as in the pedal device in accordance with a seventh aspect of the invention. Such a resin is not particularly restricted insofar as a required modulus of elasticity in bending is satisfied in the relationship with the movable member and the rotating member and in the relationship with the pedal device according to the sixth aspect of the invention, and it is possible to use a resin as a simple substance or a combination of two or more kinds of resins, or a material in which various fillers are compounded with these resins. Preferably, as in the pedal device in accordance with an eighth aspect of the invention, as the resin, the material for forming the hollow cylindrical member is one kind or two or more kinds selected from a polyamide resin such as nylon 6, nylon 66, nylon 12, nylon 46 or nylon MXD6, a polyoxymethylene resin such as an acetal copolymer or an acetal homopolymer, a thermoplastic polyester resin such as polyethylene terephthalate or polybutylene terephthalate, a liquid crystal polyester resin, a modified polyphenylene ether resin, a polyphenylene sulfide resin, a polyether sulfone resin, an aliphatic polyketone resin and a polyether ketone resin. Further, as in the pedal device in accordance with a ninth aspect of the invention, the filler includes one kind or two or more kinds selected from graphite, fluororesin, molybdenum disulfide, boron nitride, glass fibers, carbon fibers, aromatic polyamide fibers and potassium titanate whiskers, as well as lead, zinc, tin and copper and alloys thereof. It should be noted that, depending on a case, the material for forming the hollow cylindrical member may be a metal which can be regarded as a substantially rigid material as in the pedal device in accordance with a 10th aspect of the invention.

The modulus of elasticity in bending, E, of a material for forming the movable member is such that $2 \times 10^4$ kgf/cm$^2 \leq E \leq 20 \times 10^4$ kgf/cm$^2$ as in the pedal device in accordance with an 11th aspect of the invention, preferably $5 \times 10^4$ kgf/cm$^2 \leq E \leq 20 \times 10^4$ kgf/cm$^2$ as in the pedal device in accordance with a 12th aspect of the invention, more preferably $7 \times 10^4$ kgf/cm$^2 \leq E \leq 18 \times 10^4$ kgf/cm$^2$ as in the pedal device in accordance with a 13th aspect of the invention. The modulus of elasticity in bending, E, of a material for forming the rotating member is such that $2.5 \times 10^4$ kgf/cm$^2 \leq E \leq 25 \times 10^4$ kgf/cm$^2$ as in the pedal device in accordance with a 14th aspect of the invention, preferably $5 \times 10^4$ kgf/cm$^2 \leq E \leq 23 \times 10^4$ kgf/cm$^2$ as in the pedal device in accordance with a 15th aspect of the invention, more preferably $10 \times 10^4$ kgf/cm$^2 \leq E \leq 20 \times 10^4$ kgf/cm$^2$ as in the pedal device in accordance with a 16th aspect of the invention.

It should be noted that if the modulus of elasticity in bending, E, of the material for forming the rotating member exceeds $25 \times 10^4$ kgf/cm$^2$, it is necessary to make substantially small the moduli of elasticity in bending, E, of the materials for forming the movable member and the hollow cylindrical member, and there are possibilities of causing breakage and permanent set in fatigue, thereby causing a problem in durability.

In the case where the early rotation of the pedal arm is effected by the elastic deformation of the hollow cylindrical member, the rotating member and the movable member, the respective materials of the movable member and the rotating member can be appropriately selected from materials which satisfy the aforementioned moduli of elasticity in bending. The combination of the materials, however, may be determined by taking into consideration the hysteresis characteristic and the sliding characteristic that are required.

The materials for forming the movable member and the rotating member should preferably comprise resins in the same way as the material for forming the hollow cylindrical member, as in the pedal device in accordance with a 17th aspect of the invention. In this case, the resins for forming the movable member and the rotating member are not particularly restricted insofar as the required modulus of elasticity in bending is satisfied in the relationship with the hollow cylindrical member. In the same way as the material for forming the hollow cylindrical member, it is possible to use a resin as a simple substance or a combination of two or more kinds of resins, or a material in which various fillers are compounded with these resins.

As in the pedal device in accordance with an 18th aspect of the invention, as the resins, each of the materials for forming the movable member and the rotating member preferably comprises one kind or two or more kinds selected from a polyamide resin such as nylon 6, nylon 66, nylon 12, nylon 46 or nylon MXD6, a polyoxymethylene resin such as an acetal copolymer or an acetal homopolymer, a thermoplastic polyester resin such as polyethylene terephthalate or polybutylene terephthalate, a liquid crystal polyester resin, a modified polyphenylene ether resin, a polyphenylene sulfide resin, a polyether sulfone resin, an aliphatic polyketone resin and a polyether ketone resin. Further, as in the pedal device in accordance with a 19th aspect of the invention, the filler which is compounded therewith preferably includes one kind or two or more kinds selected from graphite, fluororesin, molybdenum disulfide, boron nitride, glass fibers, carbon fibers, aromatic polyamide fibers and potassium titanate whiskers, as well as lead, zinc, tin and copper and alloys thereof.

It should be noted that the pedal arm in the device of the invention is preferably the aforementioned accelerator pedal arm, but, alternatively, the pedal arm is also applicable to a brake pedal arm, a clutch pedal arm, or the like.

Hereafter, a description will be given of the present invention and its embodiment with reference to the preferred example shown in the drawings. It should be noted that the present invention is not limited to this embodiment.

Embodiment

In FIGS. 1 to 9, a pedal device 1 for an automobile in accordance with an embodiment of the present invention is comprised of a supporting frame 2; a pedal arm, i.e., in this embodiment, an accelerator pedal arm 3 which is made of a rigid metal and supported by the supporting frame 2 in such a manner as to be rotatable about an axis A in directions R; a spring means 4 for rotatively urging the accelerator pedal arm 3 toward an initial position of its rotation; a damper 5 for imparting a resistance force to the rotation in the directions R of the accelerator pedal arm 3; and a stopper (not shown) for stopping the rotation of the accelerator pedal arm 3 at the initial position of its rotation.

Figure 1:
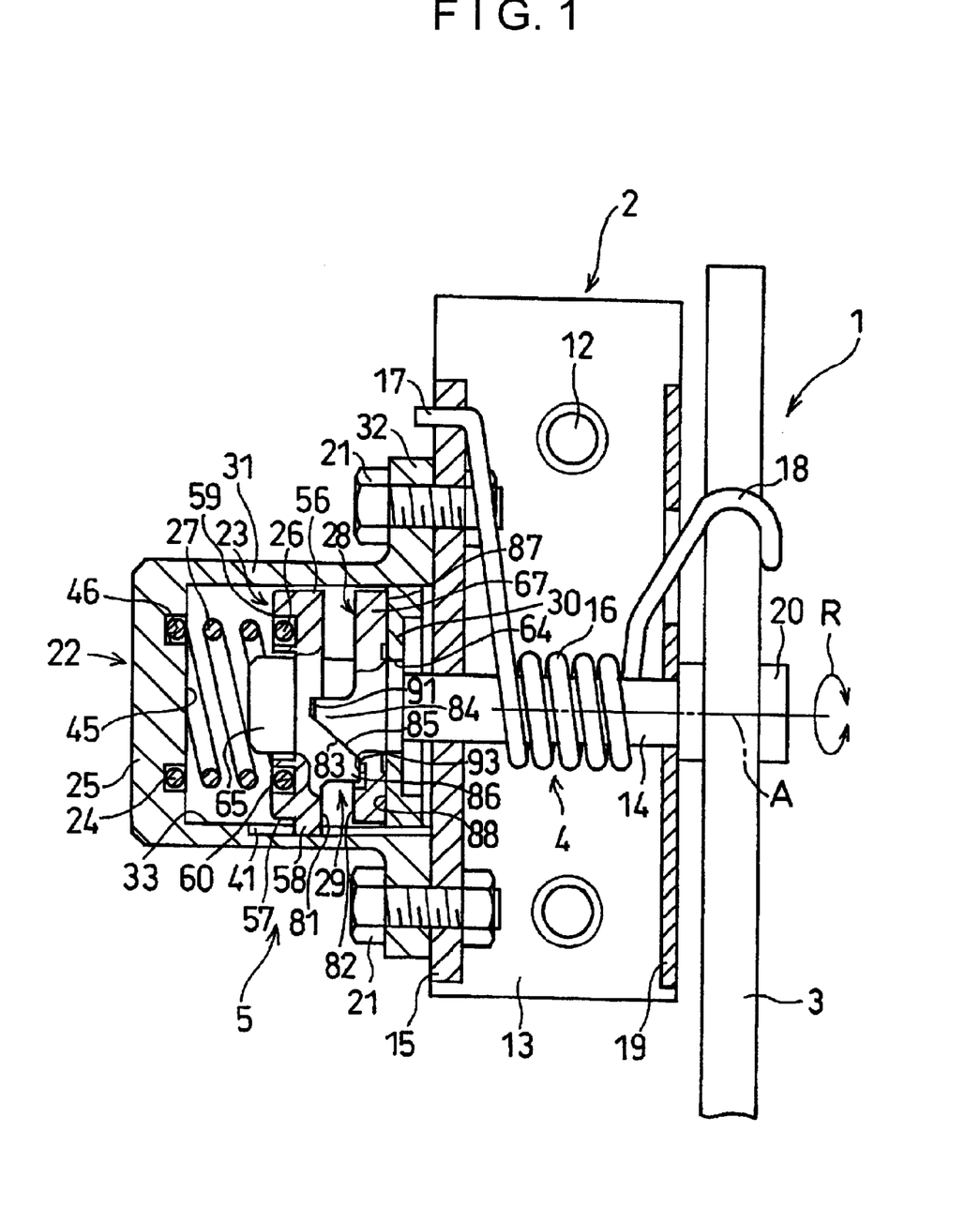
FIG. 1 is a front cross-sectional view of a preferred embodiment in accordance with the invention.

The supporting frame 2 at its bottom plate portion 13 is fixed to a vehicle body 11 by means of rivets or bolts 12 or the like, and rotatably supports the rotatable shaft 14 which is made of a rigid metal at its both side walls 15 and 19.

The accelerator pedal arm 3 has an accelerator pedal (not shown) at its tip, is secured to one end portion 20 of the rotatable shaft 14, and is supported by the supporting frame 2 via the rotatable shaft 14 in such a manner as to be rotatable in the directions R.

The spring means 4 in this embodiment is formed by a coil spring, preferably a torsion coil spring 16, in particular. One end portion 17 of the torsion coil spring 16 is engaged with the side wall 15 of the supporting frame 2, while the other end portion 18 thereof is engaged with the accelerator pedal arm 3, thereby constantly urging the accelerator pedal arm 3 resiliently in the counterclockwise direction in the directions R in FIG. 2. As the spring means 4, a compression spring may be used instead of the torsion coil spring 16.

Figure 3:
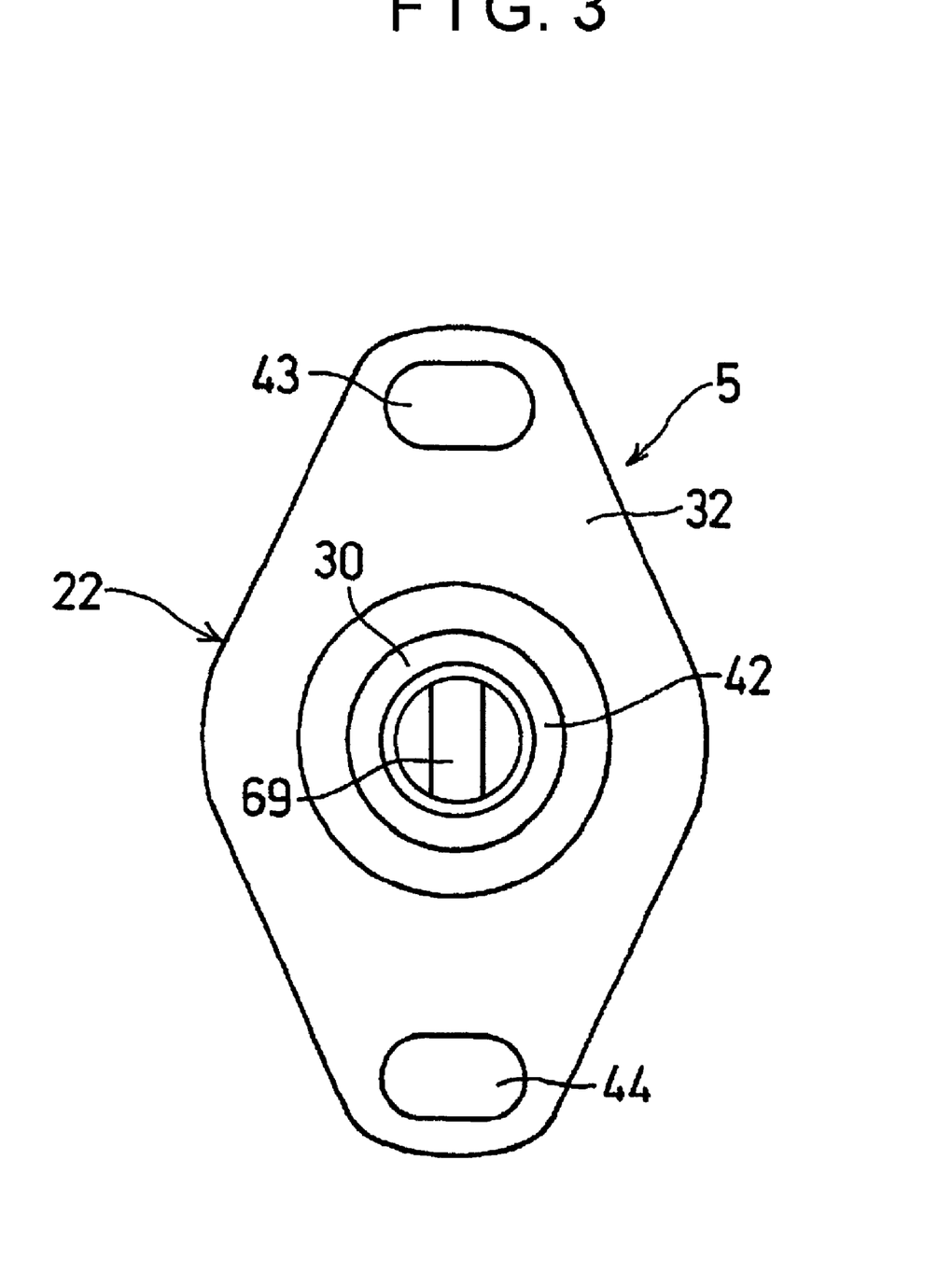
FIG. 3 is a right side view of a damper of the embodiment shown in FIG. 1.

The damper 5 is comprised of a hollow cylindrical member 22 with a bottom fixed to the side wall 15 of the supporting frame 2 at by means of bolts 21 or the like; a movable member 23 formed in the shape of an annular plate and accommodated in the hollow cylindrical member 22 in such a manner as to be movable with respect to the hollow cylindrical member 22 in the direction of its axis A but immovable in directions about the axis A, i.e., in the directions R; a coil spring, preferably a compression coil spring 27, in particular, serving as a spring means disposed between the movable member 23 and a bottom portion 25 of the hollow cylindrical member 22 and having one end 24 abutting against the bottom portion 25 of the hollow cylindrical member 22 and another end 26 abutting against the movable member 23; a rotating member 28 accommodated in the hollow cylindrical member 22 in such a manner as to oppose the movable member 23 serving as a movable spring receiver and to be rotatable about the axis A in the directions R with respect to the hollow cylindrical member 22; a cover 30 disposed at one end face of the hollow cylindrical member 22 in such a manner as to be immovable in directions about the axis; and a frictional-resistance-force generating means 29 which generates a frictional resistance force as the aforementioned resistance force in the rotation in the directions R of the rotating member 28, causes the movable member 23 to move away from the rotating member 28 in the axial direction against the resiliency of the coil spring 27 and approach the bottom portion 25 of the hollow cylindrical member 22 so as to increase the spring reaction force of the coil spring 27, thereby increasing the frictional resistance force.

The hollow cylindrical member 22 with a bottom in this embodiment has a hollow cylindrical portion 31 and the aforementioned bottom portion 25 serving as a fixed spring receiver formed integrally with the other end face of the hollow cylindrical portion 31.

The hollow cylindrical portion 31 has on its inner peripheral surface 33 at least one, in this embodiment six, grooves 41 formed in such a manner as to extend in the direction of the axis A. The grooves 41 are arranged at equiangular intervals in the direction R.

A collar portion 32 having a substantially elliptical outer shape has through holes 43 and 44 at opposite end portions in its long-axis direction. The hollow cylindrical member 22 is fixedly supported at the collar portion 32 by the side wall 15 by means of the bolts 21 or the like which are passed through the through holes 43 and 44.

An annular groove 46 is formed in an end face 45 of the bottom portion 25, and one end 24 of the coil spring 27 is seated in the groove 46.

The hollow cylindrical member 22 in this embodiment is integrally formed of a forming material comprising a polyacetal copolymer and having a modulus of elasticity in bending $E=2.6\times10^4$ kgf/cm$^2$.

Figure 4:
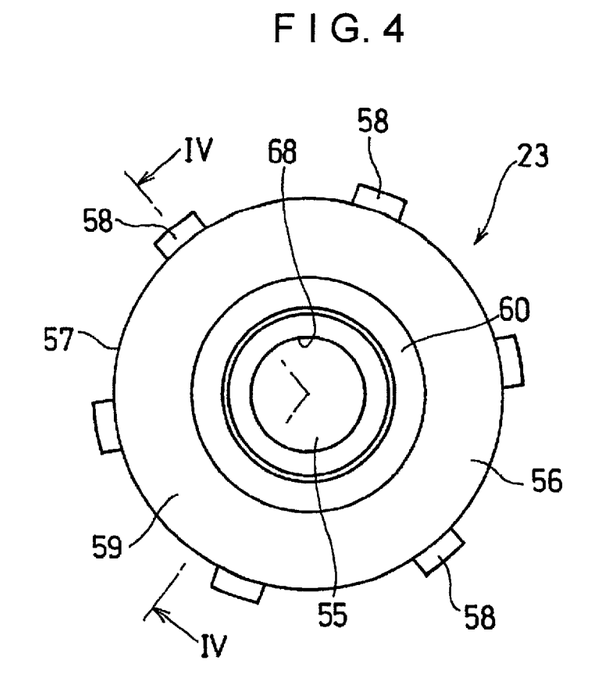
FIG. 4 is a left side view of a movable member of the embodiment shown in FIG. 1.
Figure 5:
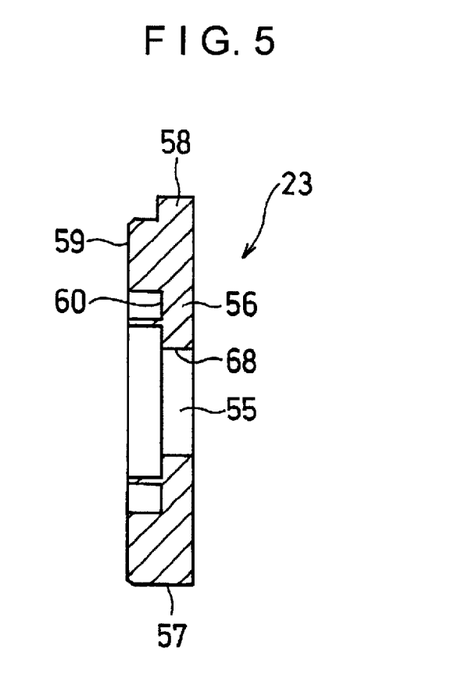
FIG. 5 is a cross-sectional view, taken along line IV—IV of FIG. 4, of the movable member shown in FIG. 4.
Figure 6:
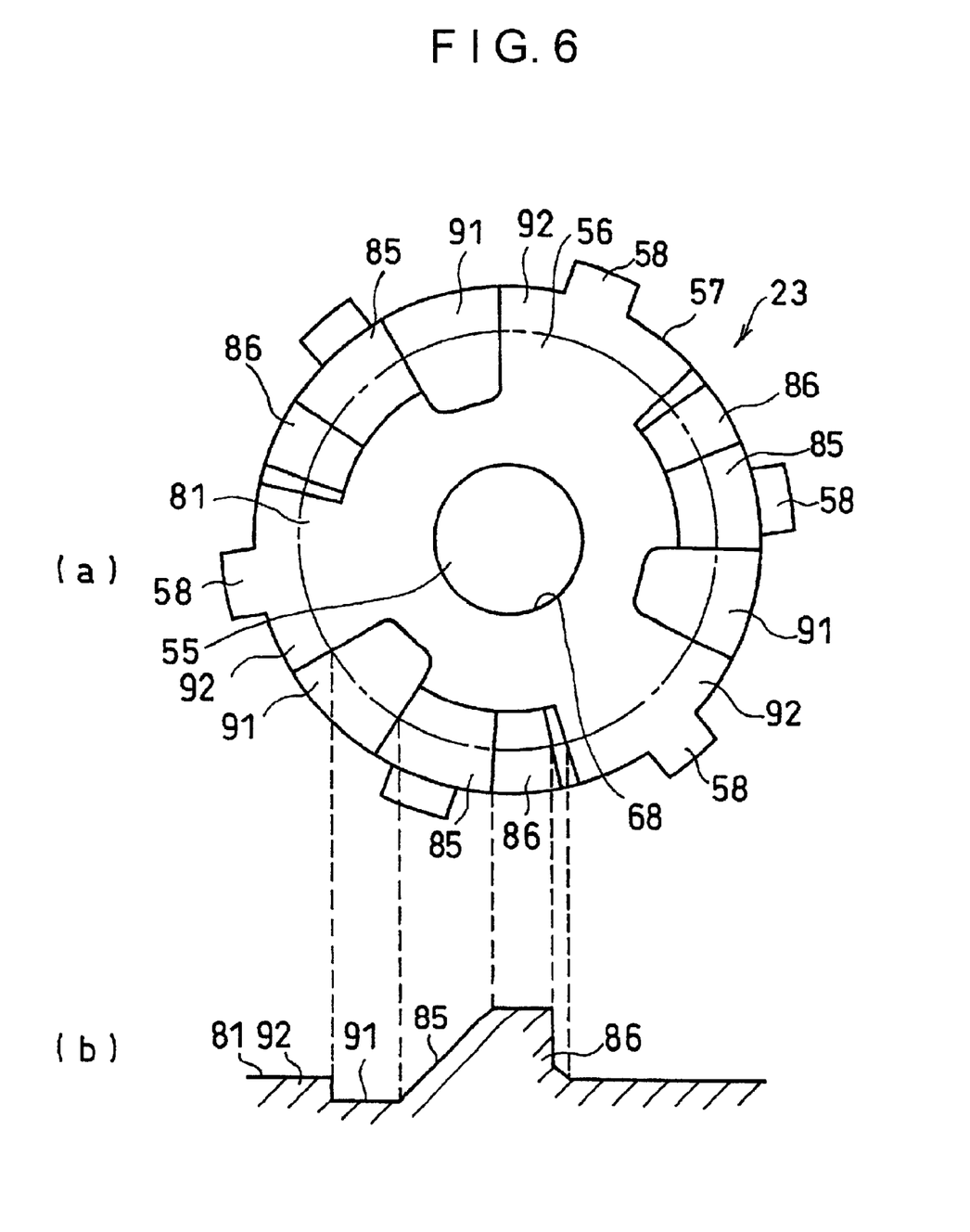
FIG. 6(a) is a right side view of the movable member of the embodiment shown in FIG. 1.
FIG. 6(b) is an explanatory diagram in which projections, recesses, and stepped portions of the movable member are illustrated in developed form.

As shown in detail particularly in FIGS. 4, 5, and 6, the movable member 23 includes a movable member body 56 formed in the shape of an annular plate and having a through hole 55 in its center; at least one, in this embodiment six, projections 58 formed integrally on an outer peripheral surface 57 of the movable member body 56; an annular groove 60 formed in a face 59 facing one end face 45 of the bottom portion 25; at least one, in this embodiment three, projections 86 formed integrally on an outer peripheral side of a surface 81 facing a surface 82 of a rotating member body 67 of the rotating member 28, in such a manner as to project in the direction of the axis A toward the surface 82 of the rotating member 28; and recesses 91 which are respectively formed in the surface 81 in such a manner as to be contiguous to the projections 86 and define stepped portions 92. The projections 58 are arranged at equiangular intervals in the direction R, and are disposed in the grooves 41 in such a manner as to be movable in the direction of the axis A. As a result, the movable member 23 is movable in the direction of the axis A but immovable in the directions R, such that the movable member 23 at the projections 58 is in contact with the hollow cylindrical member 22 slidably in the direction of the axis A. The projections 86 are arranged at equiangular intervals in the direction R. The other end 26 of the coil spring 27 is seated in the groove 60 of the movable member body 56.

The movable member 23 in this embodiment is integrally formed of a forming material comprising a liquid crystal polyester resin composition containing a fluoroplastic and having a modulus of elasticity in bending $E=10\times10^4$ kgf/cm².

The coil spring 27 is disposed in the hollow cylindrical portion 31 concentrically therewith in such a manner as to be resiliently compressed so as to cause the movable member 23 to move away from the bottom portion 25 in the direction of the axis A.

Figure 7:
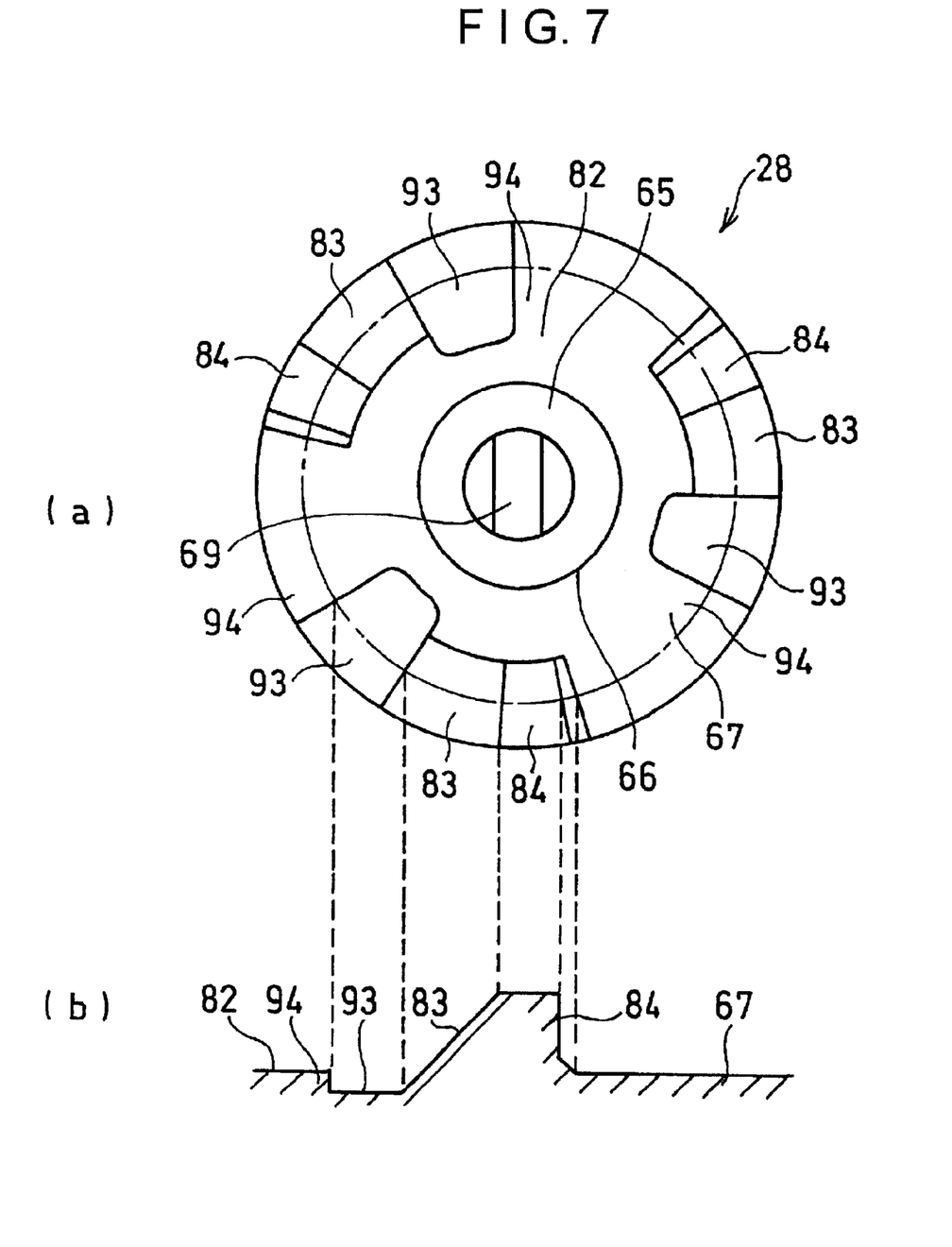
FIG. 7(a) is a left side view of the rotating member of the embodiment shown in FIG. 1.
FIG. 7(b) is an explanatory diagram in which projections, recesses, and stepped portions of the rotating member are illustrated in developed form.
Figure 8:
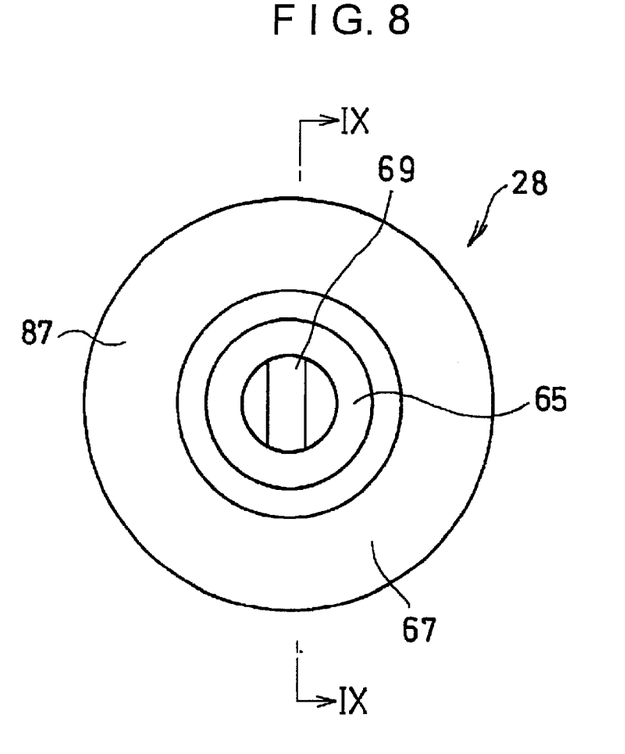
FIG. 8 is a right side view of the rotating member of the embodiment shown in FIG. 1.
Figure 9:
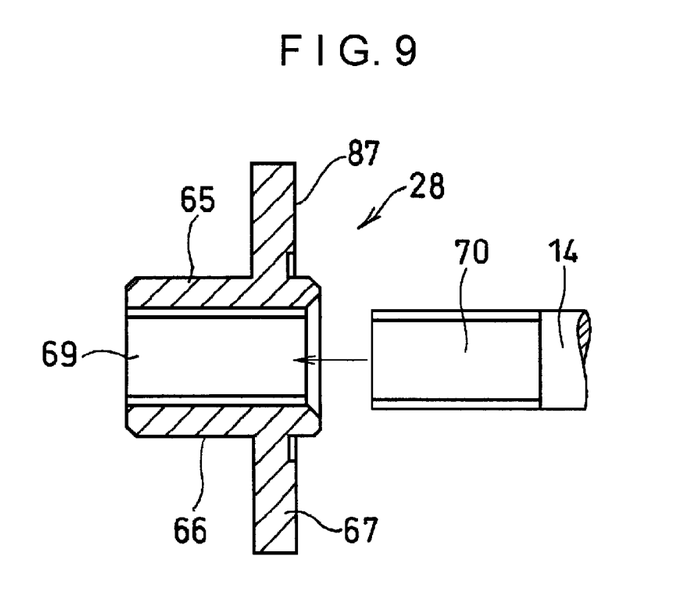
FIG. 9 is a cross-sectional view, taken along line IX—IX, of the rotating member of the embodiment shown in FIG. 8 and illustrating the relationship with a rotatable shaft.

As shown in detail particularly in FIGS. 7, 8, and 9, the rotating member 28 has a hollow cylindrical portion 65; a rotating member body 67 formed in the shape of an annular plate integrally at one end side of an outer peripheral surface 66 of the hollow cylindrical portion 65; at least one, in this embodiment three, projections 84 formed integrally on an outer peripheral side of the annular surface 82 of the rotating member body 67 in such a manner as to project in the direction of the axis A toward the surface 81 of the movable member 23; and recesses 93 which are respectively formed in the surface 82 in such a manner as to be contiguous to the projections 84 and define stepped portions 94. One end side of the hollow cylindrical portion 65 is disposed in a through hole 64 of the cover 30, and is supported by an inner peripheral surface of the cover 30, which defines the through hole 64, in such a manner as to be rotatable in the directions R. The other end side of the hollow cylindrical portion 65 is passed through the through hole 55, and extends in such a manner as to contact an inner peripheral surface 68 of the movable member body 56, which defines the through hole 55, so as to be relatively slidable with respect to the inner peripheral surface 68 of the movable member body 56 in the direction of the axis A and in the directions R. The other end portion 70 of the rotatable shaft 14 is fixedly inserted and fitted in a central hole 69 of the hollow cylindrical portion 65, and the projections 84 are arranged at equiangular intervals in the direction R.

It should be noted that if the hollow cylindrical portion 65 is formed in an elongated form so as to be passed through the through hole 55, the rotation of the rotating member 28 can be favorably guided by the inner peripheral surface 68 of the movable member body 56. An arrangement may be alternatively provided such that the hollow cylindrical portion 65 is formed in a short form without extending into the through hole 55, and the rotation of the rotating member 28 is guided by the inner peripheral surface of the cover 30 which defines the through hole 64.

The rotating member 28 in this embodiment is integrally formed of a forming material comprising a nylon MXD6/polyphenylene ether resin composition containing glass fibers and having a modulus of elasticity in bending $E=18\times10^4$ kgf/cm².

The cover 30 having the through hole 64, through which the rotatable shaft 14 is passed, is threadedly engaged with a threaded portion formed on the inner peripheral surface 33 of the hollow cylindrical portion 31, and is thus fixed to one end face of the hollow cylindrical portion 31 in such a manner as to be immovable in the directions about the axis A. An annular surface 87 of the rotating member body 67 is in contact with a fixed surface 88 which is one surface of the cover 30, in such a manner as to be slidable in the directions about the axis A and by being urged by the spring force of the coil spring 27. It should be noted that if the state in which the cover 30 is threadedly fitted into the hollow cylindrical portion 31 is changed, the initial state of compression of the coil spring 27 can be changed, thereby making it possible to arbitrarily adjust and set the initial resistance force and make it possible to obtain an optimum initial resistance force.

The cover 30 in this embodiment is integrally formed of a forming material comprising a polyacetal copolymer resin composition containing carbon fibers and having a modulus of elasticity in bending $E=16\times10^4$ kgf/cm².

The frictional-resistance-force generating means 29 includes the inclined surfaces 83 formed respectively on the projections 84; inclined surfaces 85 formed respectively on the projections 86 so as to be brought into planar contact with the inclined surfaces 83; the annular surface 87 of the rotating member body 67; the fixed surface 88 of the cover 30 for coming into planar contact with the rotatable surface 87; and the mutually sliding surfaces of the hollow cylindrical member body 31 and the projections 58 in the groove 41.

The inclined surfaces 83 and 85 are formed complementarily in such a manner as to come into planar contact with each other, preferably in such a manner as to be inclined about 45° with respect to the axis A.

Distal ends in the direction of the axis A of the respective projections 84 are fitted into the recesses 91, while distal ends in the direction of the axis A of the respective projections 86 are fitted into the recesses 93. Further, the position of initial planar contact between the inclined surface 83 and the inclined surface 85 is defined by the stepped portion 92 and the stepped portion 94.

The accelerator pedal arm 3 and the rotatable shaft 14 are formed of metal materials which are substantially rigid members in comparison with the hollow cylindrical member 22, the rotating member 28, the movable member 23, and the cover 30.

Figure 2:
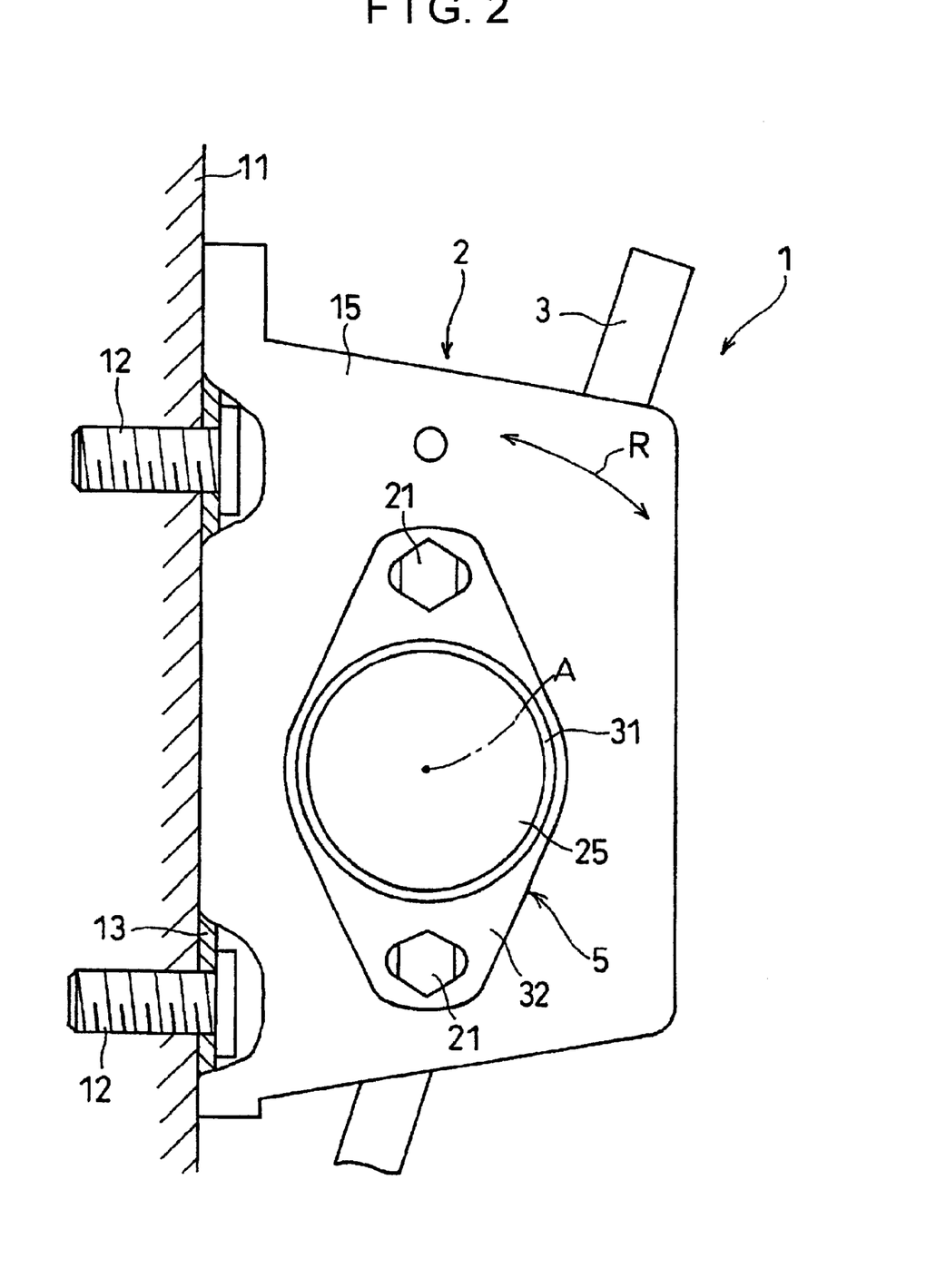
FIG. 2 is a left side view of the embodiment shown in FIG. 1.

In a vehicle, e.g., an automobile, having the above-described pedal device 1, if the accelerator pedal is pressed down, which in turn causes the accelerator pedal arm 3 to be rotated clockwise in the direction R in FIG. 2 against the resiliency of the coil spring 16, fuel injection for the engine is increased by the unillustrated electronic controller including a detector for detecting the angle of rotation of the accelerator pedal arm 3, thereby accelerating the automobile. On the other hand, if the pressing of the accelerator pedal is canceled, which in turn causes the accelerator pedal arm 3 to be rotated counterclockwise in the direction R in FIG. 2 by the resiliency of the coil spring 16, fuel injection for the engine is decreased by the unillustrated electronic controller, thereby decelerating the automobile.

Figure 10:
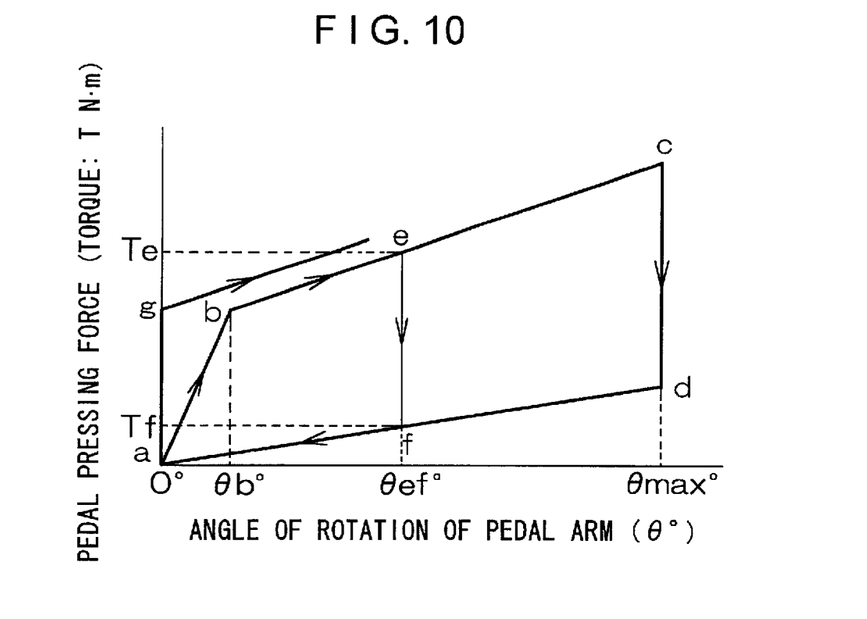
FIG. 10 is a diagram of the relationship between the angle of rotation of a pedal arm of the embodiment shown in FIG. 1 and the pedal pressing force.

With the pedal device 1, as shown in FIG. 10, when the accelerator pedal is pressed down, and until the accelerator pedal arm 3 is rotated from the initial position of rotation, 0°, to any angle θb° between 0.5 to 20% of a full angle of rotation θMax°, the rotation of the accelerator pedal arm 3 allows the elastic deformation of the hollow cylindrical member 22, the rotating member 28, and the movable member 23 to occur preferentially without practically causing the rotation of the rotating member 28. When the accelerator pedal arm 3 is rotated beyond the angle θb°, the rotation in the direction R is caused in the rotating member 28 in correspondence with the rotation of the accelerator pedal arm 3. Namely, with the pedal device 1, the arrangement provided is such that a torque (pedal pressing force) T which gradually increases from the initial position of rotation, 0°, to the angle θb° of the accelerator pedal arm 3 is imparted to the rotating member 28 to permit the rotation of the accelerator pedal arm 3, as shown by the line a–b, and the rotating member 28 is subsequently rotated in the direction R in conjunction with the rotation of the accelerator pedal arm 3.

Figure 11:
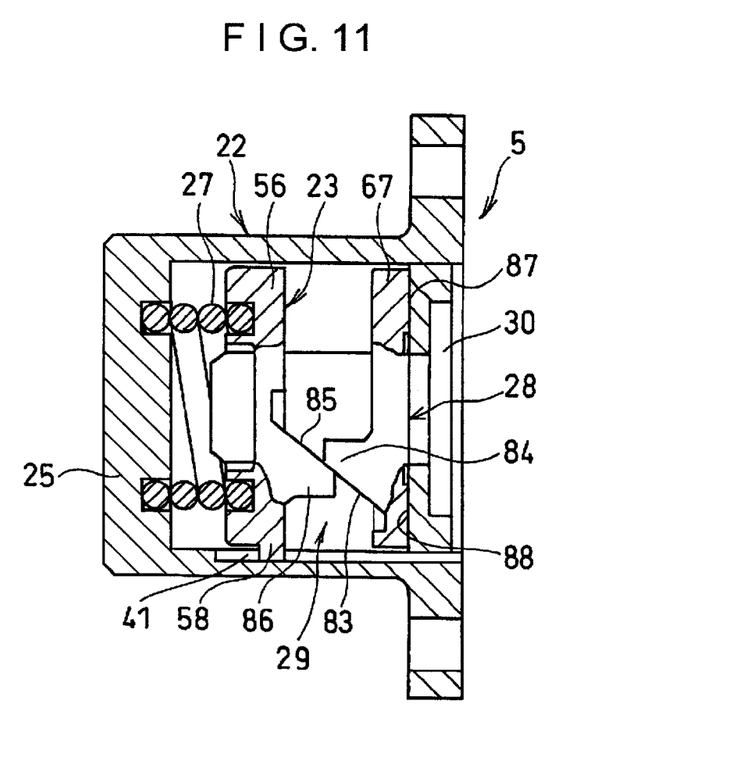
FIG. 11 is a diagram explaining the operation of the damper of the embodiment shown in FIG. 1.

If the rotating member 28 is rotated in the direction R, the projections 84 are also rotated in the direction R, and the movable member 23, which is integrally provided with the projections 86 with their inclined surfaces 85 brought into planar contact with the inclined surfaces 83, is moved toward the bottom portion 25 against the resiliency of the coil spring 27 in the direction of the axis A owing to the rotation in the direction R of the projections 84, as shown in FIG. 11. On the other hand, if the pressing of the pedal is canceled at an angle of, e.g., $\theta ef°$, the accelerator pedal arm 3 is returned to its original position 0° by the resiliency of the coil spring 16, and the movable member 23 is similarly returned to its original position, as shown in FIG. 1.

In accordance with the above-described pedal device 1, the accelerator pedal arm 3 can be rotated from the initial position of rotation, 0°, to the angle $\theta b°$ mainly by the elastic deformation of the hollow cylindrical member 22, the rotating member 28 and the movable member 23, and the rotating member 28 is subsequently rotated in conjunction with the rotation of the accelerator pedal arm 3. Therefore, at the start of the pressing down of the pedal, the accelerator pedal arm 3 is rotated in conjunction with it, with the result that it is possible to eliminate the sensation of being subjected to a large resistance based on the static friction in the frictional-resistance-force generating means 29. Hence, the driver of the automobile who operates the accelerator pedal arm 3 does not receive from the accelerator pedal the unpleasant sensation of pressing the foot against, so to speak, an immovable wall, i.e., the sensation due to the reaction force as shown by the line a–g in FIG. 10, and is able to comfortably effect the pedal operation without experiencing fatigue.

Furthermore, with the pedal device 1, if the pedal is pressed down in excess of the angle $\theta b°$, an appropriate gradually increasing resistance force (reaction force) is imparted to the rotation of the accelerator pedal arm 3 based on the pressing down of the pedal, as shown by the line b–c in FIG. 10, due to the frictional resistance between the inclined surfaces 83 and the inclined surfaces 85 which are pressed against each other by the gradually increasing resiliency of the coil spring 27, the frictional resistance between the surface 87 and the fixed surface 88, and the frictional resistance between the hollow cylindrical member 31 and the projections 58 in the groove 41. Thus, it is possible to prevent fuel from being consumed more than is necessary by excessively pressing down on the accelerator pedal. On the other hand, if the pressing of the pedal is canceled at the angle $\theta ef°$, the frictional resistance between the inclined surfaces 83 and the inclined surfaces 85, the frictional resistance between the surface 87 and the fixed surface 88, and the frictional resistance between the hollow cylindrical member 31 and the projections 58 in the groove 41 become extremely small, so that the accelerator pedal arm 3 is rotated and returned speedily to its original position with a small resistance force due to the resiliency of the coil spring 16.

In addition, with the pedal device 1, in a case where after the pressing of the pedal, the pressing of the pedal is maintained at, for example, the angle $\theta ef°$ corresponding to the case of the constant-speed running, even if the pedal pressing force is reduced from Te to Tf, the angle of rotation $\theta ef°$ of the accelerator pedal arm 3 can be maintained by virtue of the hysteresis characteristic a–b–e–f between the angle of rotation of the pedal arm and the pedal pressing force, which is based on the frictional resistance between the inclined surfaces 83 and the inclined surfaces 85, the frictional resistance between the surface 87 and the fixed surface 88, and the frictional resistance between the hollow cylindrical member 31 and the projections 58 in the groove 41. Therefore, it is possible to overcome the trouble of such as causing early fatigue to the pedal-pressing foot. Namely, with the pedal device 1, as the result of the fact that it is possible to enlarge the range Te–Tf of the pedal pressing force T in which the angle of rotation $\theta ef°$ of the accelerator pedal arm 3 with a given amount of the pedal pressed can be maintained at a fixed level in correspondence with the amount of the pedal pressed, the amount of the pedal pressed can be easily maintained at a fixed level in correspondence with the speed during the constant-speed running at various speeds ranging from the low speed to the high speed. Hence it is possible to overcome the trouble of such as causing early fatigue to the pedal-pressing foot.

Furthermore, with the pedal device 1, since it is possible to approximately determine the resistance force which can be imparted to the rotation of the accelerator pedal arm 3 by the frictional resistance between the inclined surfaces 83 and the inclined surfaces 85, the frictional resistance between the surface 87 and the fixed surface 88, and the frictional resistance between the hollow cylindrical member 31 and the projections 58 in the groove 41, it is possible to effect very simply the adjustment of the reaction force having a hysteresis characteristic. Further, by appropriately setting the respective values, the device can be made very compact, and can be installed by making effective use of a small space.

In addition, with the pedal device 1, since the coil spring 27 practically does not cause the returning force for returning the accelerator pedal arm 3 to its initial position, the reaction force is substantially not produced to the accelerator pedal arm 3 during constant-speed running, so that there is a further advantage in that early fatigue is not caused to the pedal-pressing foot.

Moreover, with the pedal device 1, since the coil spring 27 is disposed between the movable member 23 and the bottom portion 25 of the hollow cylindrical member 22 which do not rotate relative to each other, the coil spring 27 is not twisted by the rotation of the rotating member 28. Hence, the trouble of such as malfunctioning due to the twisting of the coil spring 27 does not occur.

With the pedal device 1 in accordance with this embodiment, when a test was conducted by repeating 3,000,000 times the rotation of the accelerator pedal arm 3 from the initial position of rotation, 0°, to the maximum angle $\theta max°$ (full stroke) (corresponding to the loop of the lines a–b–c–d in FIG. 10), no breakage, permanent set in fatigue, and the like occurred in each of the hollow cylindrical member 22, the movable member 23, the rotating member 28, and the cover 30, the angle of rotation $\theta b°$ was in the range of 0.5 to 20% of $\theta max°$, and the range Te–Tf of the pedal pressing force in which the angle of rotation $\theta ef°$ during constant-speed running can be maintained at a fixed level was in a satisfactory range.

In accordance with the invention, it is possible to provide a pedal device for an automobile which excels in the operational feeling, does not cause the driver to experiences a feeling of fatigue in the pedal operation, and makes it possible to enlarge the range of the pedal pressing force allowing the amount of the pedal pressed to be maintained at a fixed level in correspondence with the amount of the pedal pressed, as well as a damper suitable for use in the pedal device.

What is claimed is:

1. A pedal device for an automobile comprising:
   a pedal arm,
   a damper for imparting a resistance force to the rotation of said pedal arm,
   said damper including a movable member which is disposed movably in an axial direction but immovable in a direction about the axis, a rotating member disposed rotatably about the axis and facing said movable member, spring means for resiliently urging said movable member toward said rotating member, and frictional-resistance-force generating means for generating a frictional resistance force as the resistance force in the rotation of said rotating member, and for increasing the frictional resistance force by increasing the spring force of said spring means by causing said movable member to move away from said rotating member in the axial direction against the resiliency of said spring means, and
   a rotatable shaft connected on one end thereof to said pedal arm and on another end thereof to said rotating member for transmitting a rotation of said pedal arm to said rotating member,
   said damper having such an elastic deformation property with respect to said direction about the axis that the rotation of said pedal arm is permitted from an initial position of rotation of said pedal arm to any angle of 0.5 to 20% of a full angle of rotation thereof where said rotating member is maintained in a stationary state by the frictional resistance force of said damper, whereby a torque which gradually increases is imparted to said rotating member in said stationary state from said initial position to said angle, and that, when said pedal arm is rotated more than said angle, the frictional resistance force is overcome by the increased torque of said rotating member, whereby said rotating member is rotated in conjunction with the rotation of said pedal arm.

2. The pedal device for an automobile according to claim 1, wherein said frictional-resistance-force generating means has an inclined surface formed on one surface of said rotating member facing said movable member and an inclined surface formed on one surface of said movable member facing said rotating member and adapted to be brought into planar contact with said inclined surface.

3. The pedal device for an automobile according to claim 1 or 2, wherein said movable member has a movable member body and a projection formed integrally on one surface of said movable member body in such a manner as to project in the axial direction toward one surface of said rotating member, said rotating member has a rotating member body and a projection formed integrally on one surface of said rotating member body in such a manner as to project in the axial direction toward the one surface of said movable member, and said frictional-resistance-force generating means has inclined surfaces which are formed on both projections of said movable member and said rotating member and are brought into planar contact with each other.

4. The pedal device for an automobile according to claim 1, further comprising a rotatable shaft for transmitting the rotation of said pedal arm to said rotating member, said damper further including a hollow cylindrical member in which said movable member and said rotating member are accommodated and a cover disposed at one end surface of said hollow cylindrical member in such a manner as to be immovable in the direction about the axis, said rotating member being in contact with said cover in such a manner as to be slidable in the direction about the axis and by being urged by the spring force of said spring means, and said movable member being in contact with said hollow cylindrical member in such a manner as to be slidable in the axial direction.

5. The pedal device for an automobile according to claim 4, wherein said pedal arm and said rotatable shaft are substantially rigid members in comparison with said hollow cylindrical member, said rotating member, said movable member, and said cover, and the rotation of said pedal arm from the initial position of rotation to any angle of 0.5 to 20% of the full angle of rotation is permitted by the elastic deformation of at least one of said hollow cylindrical member, said rotating member, and said movable member.

6. The pedal device for an automobile according to claim 4 or 5, wherein a modulus of elasticity in bending, E, of a material for forming said hollow cylindrical member is such that $2 \times 10^4$ kgf/cm$^2 \leq$ E.

7. The pedal device for an automobile according to claim 4 or 5, wherein the material for forming said hollow cylindrical member comprises a resin.

8. The pedal device for an automobile according to claim 7, wherein the material for forming said hollow cylindrical member comprises one kind or two or more kinds selected from a polyamide resin, a polyoxymethylene resin, a thermoplastic polyester resin, a liquid crystal polyester resin, a modified polyphenylene ether resin, a polyphenylene sulfide resin, a polyether sulfone resin, an aliphatic polyketone resin and a polyether ketone resin.

9. The pedal device for an automobile according to claim 7, wherein the material for forming said hollow cylindrical member contains one kind or two or more kinds selected from graphite, fluororesin, molybdenum disulfide, boron nitride, glass fibers, carbon fibers, aromatic polyamide fibers and potassium titanate whiskers, as well as lead, zinc, tin and copper and alloys thereof.

10. The pedal device for an automobile according to claim 4, wherein the material for forming said hollow cylindrical member comprises a metal.

11. The pedal device for an automobile according to claim 1, wherein a modulus of elasticity in bending, E, of a material for forming said movable member is such that $2 \times 10^4$ kgf/cm$^2 \leq E \leq 20 \times 10^4$ kgf/cm$^2$.

12. The pedal device for an automobile according to claim 1, wherein a modulus of elasticity in bending, E, of a material for forming said movable member is such that $5 \times 10^4$ kgf/cm$^2 \leq E \leq 20 \times 10^4$ kgf/cm$^2$.

13. The pedal device for an automobile according to claim 1, wherein a modulus of elasticity in bending, E, of a material for forming said movable member is such that $7 \times 10^4$ kgf/cm$^2 \leq E \leq 18 \times 10^4$ kgf/cm$^2$.

14. The pedal device for an automobile according to claim 1, wherein a modulus of elasticity in bending, E, of a material for forming said rotating member is such that $2.5 \times 10^4$ kgf/cm$^2 \leq E \leq 25 \times 10^4$ kgf/cm$^2$.

15. The pedal device for an automobile according to claim 1, wherein a modulus of elasticity in bending, E, of a material for forming said rotating member is such that $5 \times 10^4$ kgf/cm$^2 \leq E \leq 23 \times 10^4$ kgf/cm$^2$.

16. The pedal device for an automobile according to claim 1, wherein a modulus of elasticity in bending, E, of a material for forming said rotating member is such that $10 \times 10^4$ kgf/cm$^2 \leq E \leq 20 \times 10^4$ kgf/cm$^2$.

17. The pedal device for an automobile according to claim 1, wherein materials for forming said rotating member and said movable member comprise resins.

18. The pedal device for an automobile according to claim 17, wherein each of materials for forming said rotating member and said movable member comprises one kind or two or more kinds selected from a polyamide resin, a polyoxymethylene resin, a thermoplastic polyester resin, a liquid crystal polyester resin, a modified polyphenylene ether resin, a polyphenylene sulfide resin, a polyether sulfone resin, an aliphatic polyketone resin and a polyether ketone resin.

19. The pedal device for an automobile according to claim 17 or 18, wherein each of the materials for forming said rotating member and said movable member contains one kind or two or more kinds selected from graphite, fluororesin, molybdenum disulfide, boron nitride, glass fibers, carbon fibers, aromatic polyamide fibers and potassium titanate whiskers, as well as lead, zinc, tin and copper and alloys thereof.

* * * * *